Charles E. Morrell Inventor
By P. L. Young Attorney

Patented Aug. 8, 1944

2,355,460

UNITED STATES PATENT OFFICE 2,355,460

TWO-STAGE ALKYLATION PROCESS

Charles E. Morrell, Roselle, N. J., assignor to Standard Oil Development Company, a corporation of Delaware Application December 28, 1939, Serial No. 311,270

21 Claims. (Cl. 260—683.4)

The present invention relates to an improved method for carrying out two-stage alkylation processes in which the olefins to be reacted with isoparaffins to form normally liquid saturated hydrocarbons are first contacted with sulfuric acid and the extract so formed is reacted with isoparaffins to produce the desired products.

It has previously been proposed to alkylate olefin extracts of sulfuric acid with isoparaffins to form saturated normally liquid hydrocarbons. However, in operating such a process by employing in the extraction stage high acid : olefin ratios such as those customarily employed in the alkylation stage, the reaction was found to be controlled with great difficulty, to such an extent that the alkylation reaction took place in the olefin extraction reactor rather than in the alkylation reactor. Also, it was found that the use of high acid:olefin ratios in the feed to the extraction reactor resulted in the formation of an emulsion which could not effectively be separated by the use of an ordinary acid settler. Furthermore, substantial amounts of hydropolymerization of the olefin in the extraction stage were evident.

It has now been found that these difficulties may be surprisingly overcome if the extraction stage is carried out in a particular manner. It has been found that when employing a refinery $C_4$ cut containing normal butylenes, isobutylene, isobutane and normal butane as a feed stock in a two-stage alkylation reaction, the disadvantages above mentioned may be obviated by employing as the extraction medium in all or part of the extraction system an olefin-acid extract instead of either dilute or concentrated sulfuric acid. In other words, it has been found that the isobutylene-containing feed stocks should be contacted with sulfuric acid-butylene extracts under suitable extraction conditions; that the amount of acid with respect to the olefin fed to the extractor should be carefully controlled to avoid the use of large amounts of acid with respect to the olefins fed. In fact, the mol ratio of acid:olefin fed may be as low as 0.4 mol of acid per mol of olefin. This molar ratio may be increased to as high as 1.2 or 1.3 mols of acid per mol of olefin, the most desirable value depending upon the nature of the olefins fed. If the fresh feed is contacted with a sulfuric acid-olefin extract containing between about 30 and about 50% by weight of dissolved olefins, the isobutylene present in the feed is converted into heavier liquid products, for example, polymers of isobutylene, copolymers of isobutylene with normal butylenes and some small amounts of alkylation products. The normal butylenes remaining in an unpolymerized form are then absorbed in the olefin extract. The isobutane and normal butane over and above that small portion which remains dissolved in the polymer and in the acid extract is then separated from the olefin extract by passing the polymer and the $C_4$ paraffins into a polymer debutanizer where the olefin-free $C_4$ cut containing iso- and normal butanes is separated as overhead and conducted to a fractionating column for separation of isobutane as overhead from normal butane. The polymer from the polymer debutanizer which is collected as bottoms may then be employed for any number of desired purposes, for example, as a feed stock to an alkylation reaction, as a feed stock to a hydrogenation unit, and the like. The olefin extract is then returned to the extractor for the further extraction of normal butylenes therein, or is passed directly to an alkylation zone where it is contacted with isobutane or some other isoparaffin, for example, isopentane and the like, and alkylated.

One of the advantages of the present process lies in an efficient segregation of the utilizable olefinic constituents of ordinary refinery gases to attain an ultimate economical yield of the desired motor fuel of high octane number which is substantially saturated in character without undergoing tedious and expensive fractionation of these refinery gaseous mixtures beforehand. The separation of paraffins from olefins is effectively carried out and it is a relatively simple matter to separate isobutane from normal butane once the olefins have been substantially completely removed therefrom. The normal butane separated by such a process may be subjected to partial or complete dehydrogention, to isomerization and/or partial and/or complete dehydrogenation and in other ways utilized for increasing the supply of olefins and/or branched chain paraffins for further use in the process of the present invention. By operating according to the present process, it is possible to reduce olefin sulfonation, together with the attendant emulsification troubles, to minimize acid consumption, to improve yields, etc., to reduce the amount of hydropolymerization occuring in the extraction step to a substantial minimum and to thereby more effectively control the ultimate production of high yields of substantially completely saturated, normally liquid hydrocarbons boiling within the motor fuel range and which have high desirable and improved octane numbers.

Depending upon the particular feed stocks employed, it is possible to vary the reaction conditions both for the alkylation and extraction stages so as to accomplish the desired herein stated objects. There are many types of refinery gases which are suitable as feed stocks for use in the present process. Refinery $C_4$ and/or $C_5$ cuts, as well as $C_3$ cuts, are entirely suitable for use in the present process once the correlation of acid strength, optimum ratios of olefin : acid in the extract, temperatures and the like are determined for optimum extraction in the first stage of the process. The refinery gases ordinarily do not contain sufficient amounts of the isoparaffins containing at least one tertiary carbon atom per molecule to efficiently promote alkylation reactions. The feed stocks may therefore be extraneously supplied with isoparaffins and/or olefins from other sources such as from field butanes, cracked gases, gases from dehydrogenation units and the like. The greater flexibility of operation of the present process makes the utilization of gases of widely varying compositions particularly adaptable for use therein.

The process of the present invention is readily adapted to continuous operation, particularly so where sufficient superatmospheric pressure is employed in the system to maintain the hydrocarbons in the alkylation as well as the extraction step as a liquid phase under the conditions obtaining. Such a process promotes the ultimate commercial production of high quality gasoline from gases heretofore considered of little value.

It is advantageous for the purposes of this invention that the extraction be conducted in such a manner that at every point in the extraction the effective extraction medium is a preformed acid-olefin extract. This preformed extract may constitute the feed to the particular step in the extraction or may be formed within the actual step under consideration even when using acid previously undiluted with olefin, such as recycle alkylation acid, as feed to the particular step. In the latter case, the acid feed is so added that it dilutes the acid extract hold-up or content existing in the reactor before it comes in contact for prolonged periods of time with unextracted olefin. In other words, the acid extract phase content in the particular extraction stage is so controlled within the stage that at any given time it actually is an acid-olefin extract of the composition hereinafter more fully described. There are two preferred methods for effecting the dilution of the acid extract phase hold-up in the particular extraction stage with fresh acid feed, i. e., acid undiluted with olefin. In one of these, the acid extract phase is made the continuous phase of the emulsion. Under these conditions, the fresh acid may be fed directly to the extraction stage and dilutes the existing acid extract phase before appreciable time of contact with unextracted olefin can occur. In the other, a portion of the emulsion may be withdrawn from the particular extraction stage, allowed to settle, the extract phase diluted with fresh acid feed and the two phases recycled together or separately to the extraction zone.

A refinery $C_4$ cut containing about 20% of normal butylenes and about 10% of isobutylene could advisedly be contacted with a sulfuric acid-butylene extract to get an extract having a molar ratio of about 1:1 of acid to olefin by feeding about 14 mols of acid per 30 mols of olefin continuously into an extraction unit in which a continuous acid extract phase is maintained. In this manner, all of the isobutylene plus about 30% of the normal butylenes would be converted to higher boiling material of the nature heretofore described. In addition, the remaining normal butylenes would be absorbed in the extract. Likewise, in the case of refinery spent $C_4$ cut from a cold acid polymerization process containing chiefly normal butylenes as the olefinic content, the feed stock would be subjected to an olefin-sulfuric acid extract by feeding under similar conditions the acid and $C_4$ cut in the molar ratio of about 25 mols of acid to about 30 mols of olefin.

In general, acid of 90 to 98% concentration, preferably 96% concentration, is employed. This acid is usually directly introduced into the alkylation reactor, the partially spent acid being conducted to the olefin extraction zones. The invention specifically contemplates the use of refinery $C_4$ cuts containing from 20 to 30% of normal butylenes and from 10 to 12% of isobutylene. Such refinery $C_4$ cuts are obtained as normally gaseous effluents from thermal and catalytic cracking processes. Likewise, the present invention contemplates the specific use of spent $C_4$ cuts from cold acid plants involving the polymerization of isobutylene from $C_4$ cuts. Such spent $C_4$ cuts contain isobutylene in an amount between about 2 and about 4% and normal butylenes in an amount between about 25 and about 30%. Likewise, spent refinery $C_4$ cuts from hot acid polymerization plants containing about 15% unsaturates, chiefly as butene-2, may be used either per se or blended with normal or isobutanes so as to give an ultimate $C_4$ composition containing about 10 to 16% normal butylenes and about 0.2 to about 0.4% isobutylene. Also, the olefin entering the reaction mixture is not limited to $C_4$ olefins but may be any of the monoolefins, such as ethylene, propylene, pentenes, hexenes, etc., or mixtures of two or more of these. For every specific type of olefin feed stock the conditions of absorption should be varied to secure optimum absorption with minimum polymer formation.

According to the present invention, sulfuric acid of alkylating strength is employed in both the alkylation and olefin absorption stages. This is a direct improvement over the previously known two-stage alkylation processes for the reason that it has been found unnecessary to selectively absorb olefins using dilute surfuric acid, that is, acid of around 60%–70% concentration, in order to absorb the desired branched chain olefins followed by the concentration of the extract with fresh or fuming sulfuric acid up to the desired alkylating concentration of sulfuric acid. The advantage of employing a single strength sulfuric acid for both stages of operation obviously affords several advantages to the process. The process, although not necessarily being carried out in such a manner as to minimie the formation of polymer in the extraction stage, is preferably so carried out as to minimize polymer formation since it has ben found that the use of polymer in whole or in part as the olefinic component of the feed stock to an alkylation unit results in the formation of alkylate in smaller yields with decreased octane number of the resulting alkylate than is the case when using olefin-sulfuric acid extract as the olefinic constituent of the feed stock to an alkylation reactor. The process of the present invention, therefore, contemplates the carrying out of the extraction step in such a manner as to minimize the formation of polymer. Although the formation of polymer is not wholly suppressed even when contacting feed stocks substantially devoid of isobutylene, nevertheless, under the conditions to be hereinafter more fully detailed, polymer formation may be maintained at a minimum. The amounts of high boiling material formed in the extraction stage increases with the temperature and the concentration of isobutylene in the $C_4$ feed. Large excesses of acid, that is, sulfuric acid fed to the extractor to butylene mol ratios, for example above 1.25, also enhance polymer formation. The use of large acid excesses should be avoided, preferably. However, the formation of polymer is not entirely a loss of olefin since this polymer does alkylate and since a useful octane number saturated product may be formed therefrom by feeding the polymer to the alkylation unit.

The olefin extract coming from the extractor and being introduced into an alkylation reactor contains at least 0.4 mol of olefin per mol of alkylation recycle sulfuric acid and preferably contains between about 0.7 and about 1.3 mol of olefin per mol of recycle acid. Temperatures of between about 10 and 50° F. are ordinarily maintained in the olefin extraction zones. Where the acid is fed to the extractor at a rate corresponding to about 0.4 mol of acid per mol of olefin fed, the time of residence of the acid extract phase in the extractor is between about 10 and about 40 minutes. The time of residence of the hydrocarbon phase, that is, the polymer-containing phase, is between about 4 and 15 minutes. The time of residence of the various types of feed stocks in the extractor may vary depending upon the reactivity of the olefin content thereof. For example, the acid extract from a spent $C_4$ cut from a hot acid polymerization process which, of course, contains only traces of isobutylene, may reside in the extractor for from about 25 to 40 minutes whereas it is not advisable to permit the olefin content of the acid phase formed from a raw refinery $C_4$ cut containing as high as 10 or 20% of isobutylenes to remain in the extractor longer than from about 10 to 15 or possibly 20 minutes. Under these conditions, the formation of difficultly separable emulsions is not encountered either when employing fresh sulfuric acid or alkylation plant recycle sulfuric acid as feed to the extraction stage.

In view of these conditions, it is possible to conduct the extraction stage in a number of ways. For example, a large mixing unit equipped with a mechanical stirrer or turbo mixer or some similar mechanical mixing device may be employed as the extraction unit, the acid and hydrocarbon phases being withdrawn as a mixture or emulsion to a separate settling tank where the phases separate out, the extract being withdrawn from the bottom of the settling tank, the hydrocarbon or polymer phase being withdrawn from the top. The extraction may also be carried out employing a baffle tower in a countercurrent manner, allowing the sulfuric acid or an extract of sulfuric acid to flow downwardly therethru while permitting the olefin-containing hydrocarbon feed to flow upwardly therethru. However, it is preferred to employ a mixing and settler tank type of system. The process of the present invention contemplates not only the use of a single extractor, but also the use of a plurality of extractors arranged in series or parallel. As will be more fully hereinafter described with reference to the drawings, a series of extractors can be so operated as to contact an isobutylene-containing feed stock with an olefin-containing extract of sulfuric acid rather than with fresh sulfuric acid of alkylating strength. In this manner, polymer formation is substantially reduced and the greater part of the normal butylene content of the feed stock is converted into an extract with the sulfuric acid, thereby reducing the formation of copolymer of isobutylene with normal butylenes to a minimum. When employing a series of extractors in parallel arrangement, the extract and polymer phases may be combined and fed to a single alkylation reactor or the extracts may be separately fed to a plurality of alkylation reactors as the exigencies of the particular plant require. As previously mentioned, the extract phase may also be diluted with acid devoid of olefins and returned to the extraction stages for further extract formation.

Both the absorption and alkylation zones are preferably maintained under sufficient pressure so that all of the components of the reaction mixture, extracts, polymer phases, etc. are maintained in the liquid phase. The preformed olefin-sulfuric acid extract, together with isoparaffins or mixture of isoparaffins, is dispersed in an alkylation chamber containing sulfuric acid in a suitable amount and of a strength ranging from 90 to 110% concentration, preferably about 96 or about 98 concentration. The temperature of the alkylation zone is maintained between about 30 and about 75° F., preferably between about 35 and about 50° F. If desired, it is entirely feasible to maintain the absorption stage and the alkylation stage under substantially the same temperature, namely, a temperature of around 35° F., although for some types of feed stocks the absorbers should be maintained at somewhat lower or higher temperatures. As the olefin acid extract-isoparaffin mixture is continuously introduced into the alkylation zone, the partially reacted mixture is withdrawn and simultaneously recirculated and reintroduced into the alkylation zone with or near the point of introduction of the fresh extract and isoparaffin. Usually the amount of recirculation is quite large relative to the amount of olefin fed, that is, of the order of about 20 to about 100 volumes of acid-hydrocarbon recycle emulsion per volume of olefin extract added. It is desirable, also, to maintain large normal excesses of isoparaffins in the alkylation zone with respect to the quantity of olefin extract fed thereto, usually at least 5:1 molar ratio and preferably from 10 to 100:1. By taking these precautions as to the amount of fresh extract added to the alkylation zone, the deterioration of the sulfuric alkylating acid is maintained at a minimum, thereby materially increasing the ultimate catalyst life of the sulfuric acid before it is necessary to remove the spent acid from the system and either regenerate the same for reuse in the alkylation system or to use the spent acid as such in other refinery processes, for example, in treating sulfur-containing naphthas.

The reacted mixture is withdrawn to a settler where the acid phase is separated from the hydrocarbon phase and either returned to the alkylation reactor or returned to the extractors for the further formation of olefin acid extract. The hydrocarbon phase is subjected to caustic treatment to remove any traces of acid present and then subjected to fractional distillation to remove unreacted reactants. The resulting alkylate is then subjected to suitable distillation to recover the desired cuts. Products boiling above and/or below the desired fractions may be returned in whole or in part to the alkylation zone to suppress their further formation.

For a more complete understanding of the process of the present invention, reference may be had to the accompanying drawings which are diagrammatic representations of a suitable unit for accomplishing the desired process.

In Fig. 3 as in Fig. 2 the sulfuric acid recycled from the alkylation unit in a general way is conducted thru the extractors in a countercurrent manner with respect to the conduction of the feed stock thru the extractors. In Fig. 3 each extraction unit represents a series arrangement of extractor, settler, and fractionating column. This arrangement of extractors is likewise intended as a substitution for the single extractor disclosed in Fig. 1.

For purposes of illustration only, the operation of the present invention will be described using a refinery C₄ cut as a feed stock although as heretofore pointed out, the process is not limited to such a specific hydrocarbon mixture. Various types of refinery C₄ cuts may be employed having contents of isobutane, normal butane, isobutylene and normal butylenes present in various percentages, for example, some refinery C₄ cuts contain practically no isobutylene while others may contain as high as 20% isobutylene. Likewise, the normal butylene content of the various C₄ cuts may range from 2 to 3% to as high as 30%. The relationship of the normal butane to isobutane content of the various refinery C₄ cuts usually is in about a 3:1 volume ratio. However, the invention is not limited to the use of such paraffinic ratios.

Figure 1:
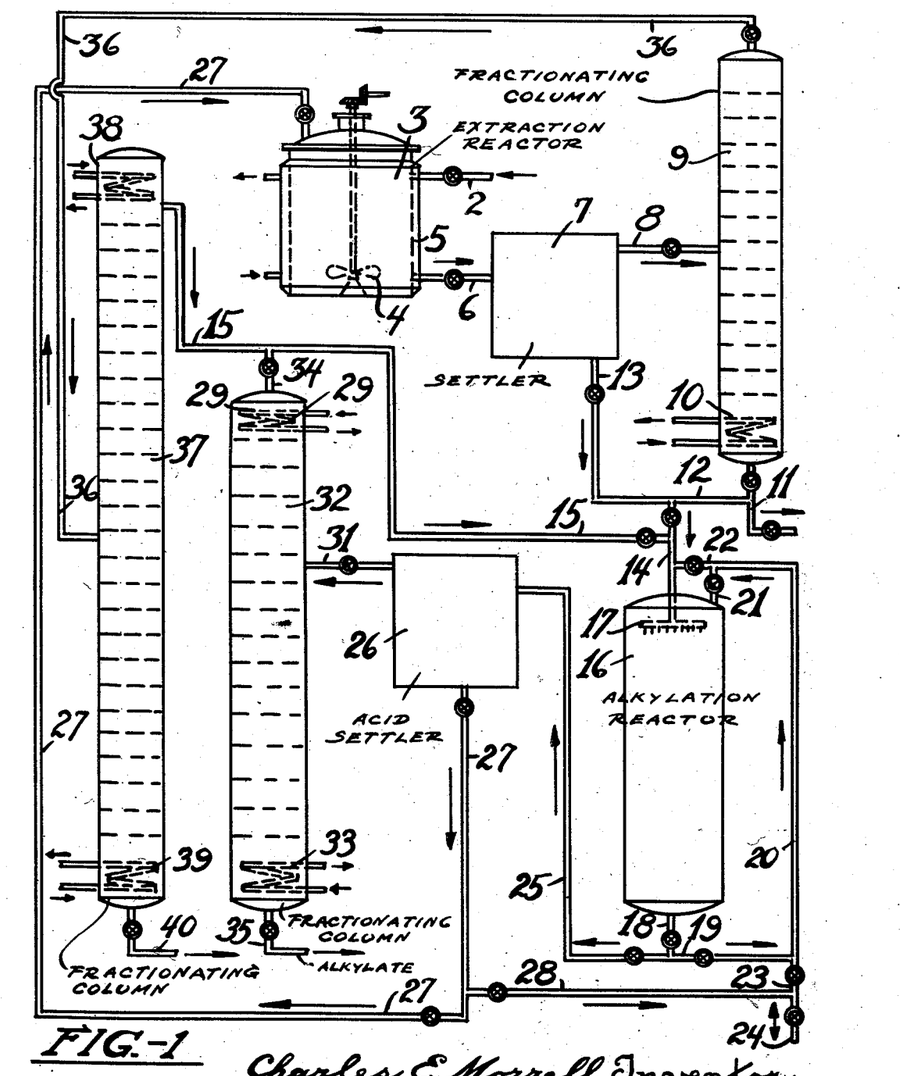
Fig. 1 represents a combined extraction and alkylation unit in which a single-stage extractor is connected with a single settler and the extract and polymer are fed to a single alkylation reactor.

A suitable refinery C₄ cut feed stock is introduced into extractor 3 by means of pipe 2. Extractor 3 is proided with an agitation means, for example, a mechanical stirrer 4. The extractor is also equipped with a jacket 5 for controlling the temperature thereof. The acid-hydrocarbon mixture from extractor 3 is conducted by means of pipe 6 into settler 7 wherein a hydrocarbon layer is withdrawn thru pipe 8 into fractionating column 9 equipped with a heating means 10. The overhead from fractionating column 9 comprising essentially normal and isobutanes is conducted by means of pipe 36 into fractionating column 37 equipped with a cooling means 38 and a heating means 39. The isobutane evolved as overhead from this column is conducted by means of pipe 15 thru pipe 14 into alkylation reaction 16. The sulfuric acid-olefin extract from settler 7 is withdrawn by means of pipe 13. The heavy polymer bottoms discharged from column 9 may either be withdrawn thru pipe 11 or cooled and combined by means of pipe 12 with the olefin-acid extract of pipe 13 and introduced by means of pipe 14 into alkylation reactor 16 together with the isobutane from pipe 15. The cooler for the polymer bottoms emerging from fractionating column 9 and being conducted into alkylation reactor 16 is not shown in the drawings.

Alkylation reactor 16 is equipped with a dispersion device 17 of any suitable construction, for example, this device may be a jet, a turbo mixer, or some suitable dispersion device. The alkylation reactor 16 is maintained at a suitable alkylation temperature. The effluent from reactor 16 is discharged thru line 18 and the emulsion may either be returned to reactor 16 or it may be conducted to an acid settler 26 by means of pipe 25. If the emulsion is not sufficiently reacted, it is conducted by means of pipes 19, 20 and/or pipes 21 and 22 back into the alkylation reactor 16. If it is desired to directly introduce the emulsion into reactor 16, pipe 21 is employed. If, however, it is desired to mix the feed with the emulsion prior to the reintroduction of the emulsion, pipe 22 is employed and the emulsion is redispersed into the reactor by means of dispersion device 17. As shown in the drawings, the dispersion device is located at or near the top of reactor 16. However, in commercial operation it is preferred to have the point of introduction of the recycled emulsion and fresh reactants at the bottom of the alkylation reactor 16. In such a case, the recycle of the emulsion would be by withdrawing the partially reacted mixture from the top of the reactor 16 by means of a pipe analogous to pipe 18 and reintroducing the emulsion into the reactor either directly or thru the mixing device at the bottom of reactor 16.

The reacted mixture conducted by means of line 25 to settler 26 is separated into two phases, a partially spent acid phase as a lower layer and a hydrocarbon phase as the upper layer. The partially spent acid is withdrawn from settler 26 by means of pipe 27. It may then be either reintroduced into reactor 16 by means of pipes 28, 23, 20, 21 and/or 22, withdrawn from the system by means of pipes 28 and 24, introduced into extractor 3 by means of pipe 27 where it is employed as the extraction medium for the olefinic content of the fresh feed or mixed with olefin extract and then introduced into extractor 3.

To compensate for the removal of spent acid by means of outlet pipe 24, fresh acid, either alkylating strength, fuming acid, or sulfur trioxide, may be introduced by means of pipe 24 into the system.

The hydrocarbon layer is withdrawn from settler 26 and introduced into fractionating column 32 by means of pipe 31. Fractionating column 32 is equipped with cooling coil 29 and heating coil 33. Any unreacted reactants from the alkylation reaction are withdrawn from column 32 by means of pipe 34 and conducted back to the alkylation reactor 16 by means of pipe 15. The higher boiling products comprising essentially the desired alkylation products are withdrawn from the system by means of pipe 35. These products may be subjected to further fractionation treatment to secure the desired fractions. The higher and lower boiling fractions, that is, those fractions not desired, may then be introduced into the alkylation reactor 16 by any suitable means.

The bottoms from fractionating column 37 comprises essentially normal paraffins, for example, normal butane, they are withdrawn from the system by means of pipe 40. These normal paraffins, for example normal butane, may then be subjected to dehydrogenation treatment, either substantially completely or partially, to a combined dehydrogenation and isomerization treatment, although this is not the preferred procedure. If the resultant products are to be reintroduced into the system, all the normal butane may be introduced directly into an isomerization unit for the further production of isobutane which finds important uses in the present system. It is desirable to have large excesses of isobutane present in the alkylation reactor.

Figure 2:
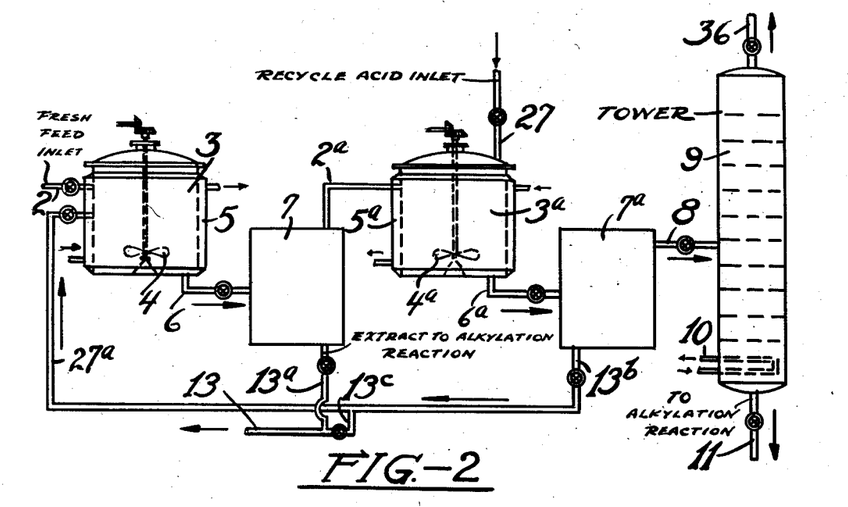
Fig. 2 represents a diagrammatic illustration of two extractors arranged in series wherein the separation of the paraffins in the feed stock from the polymer takes place in a single fractionating column. It is to be distinctly understood that any desired number of extractors may be arranged in series. However, for illustration purposes only, two extractors are shown. The arrangement of extractors is designed to supplant the single extractor described in Fig. 1.

Fig. 2 discloses a modification of the apparatus represented by extraction chamber 3, settler 7 and fractionating column 9 of Fig. 1. In both Figs. 2 and 3 the parts which are similar to those represented in Fig. 1 are similarly numbered with respect to the numbers shown in Fig. 1.

In Fig. 2 the fresh feed is conducted into extractor 3 by means of inlet pipe 2. Extractor 3 is provided with a temperature controlling jacket 5 and a mixing device 4. The effluent from extractor 3 is conducted by means of pipe 6 into settler 7 where the olefin-acid extract is withdrawn by means of pipe 13a connected with pipe 13 which leads to the alkylation reactor or to a mixing chamber (not shown) for diluting the extract with acid from pipe 27 and then returning the diluted extract to extractor 3a. The hydrocarbon layer is introduced into extractor 3a by means of pipe 2a. Extractor 3a is similarly equipped with temperature controlling jacket 5a and stirring device 4a. The acid from the alkylation reactor is introduced into this extractor by means of pipe 27. The effluent from extractor 3a is conducted by means of pipe 6a into a second settler 7a. The olefin-sulfuric acid extract is withdrawn from settler 7a by means of pipe 13b. All, or at least a portion, of the extract from this settler, either diluted with acid from line 27 or not, is conducted by means of pipe 27a into the initial extractor 3. If desired, a portion of it may be withdrawn by means of pipe 13c and combined with the extract from separator 7 in pipe 13. If desired, the extracts from settlers 7 and 7a may be conducted to separate alkylation units or to the same alkylation unit at different intervals of time so that the alkylation is carried out using only one type of extract. The normally gaseous hydrocarbons, together with polymer in settler 7a, is conducted by means of pipe 8 into fractionating column 9 provided with heating means 10 and pipes 36 and 11 serving the functions described therefor in Fig. 1. This particular combination of extractors and settlers is advantageously employed when it is desired to contact a refinery C₄ cut containing isobutylene as well as normal butylenes with a suitable extraction medium. The fresh feed entering extractor 3 is contacted with an extract removed from settler 7a and which is composed predominantly of normal butylenes-sulfuric acid. In this way, the amount of polymerization and other condensation reactions is substantially reduced so that the amount of polymer formation is materially decreased. Some small amounts of normal butylene extraction occur in extractor 3 and the extract is removed from contact with the polymer and unextracted normal butylenes as well as the paraffinic constituents of the refinery C₄ cut by means of pipe 13a connected to settler 7. The majority of the normal butylenes are, however, extracted in the second extractor 3a but in this instance the recycle acid introduced by means of pipe 27 is contacted with a hydrocarbon mixture substantially free of isobutylene, hence no excessive further polymer formation occurs in extractor 3a.

Figure 3:
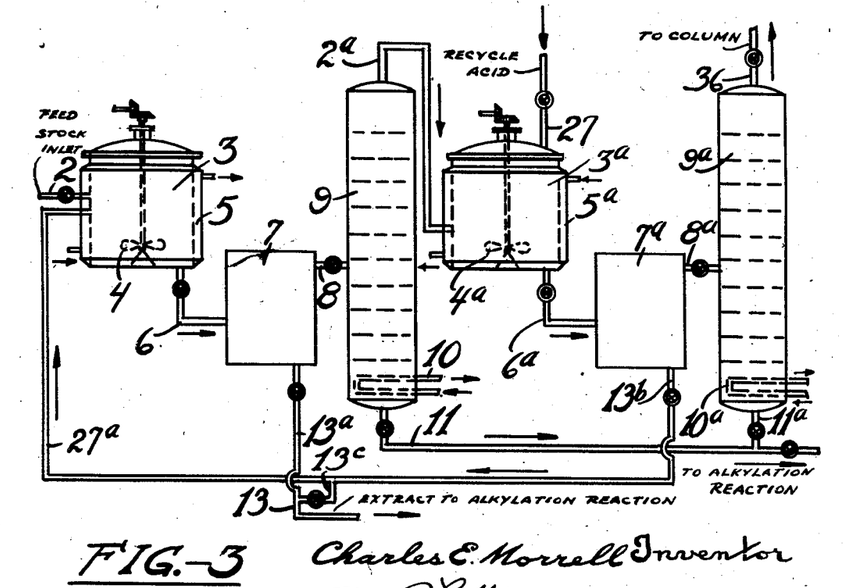
Fig. 3 represents a diagrammatic illustration of a series of extractors in which polymer formed in the first extractor is removed from the system prior to the introduction of the remaining olefins and paraffins into the second extractor.

In Fig. 3 a further modification of the extraction apparatus disclosed in Figs. 1 and 2 is presented. Substantially the same type of feed stock for which the apparatus represented by Fig. 2 is designed is particularly suited for use in the apparatus represented by Fig. 3. The refinery C₄ cut containing isobutylene as well as normal butylenes is introduced into extractor 3 by means of pipe 2 and is contacted with alkylation recycle acid containing normal butylenes. This extract is introduced into extractor 3 by means of pipe 27a which is directly connected to pipe 13b coming from the second settler 7a. The effluent from extractor 3 is introduced into settler 7 where the acid extract is withdrawn by means of pipe 13a and the hydrocarbon layer is withdrawn by means of pipe 8 and introduced into fractionating column 9 provided with a heating means 10. Column 9 is designed to effect a separation between the polymer formed in extractor 3 and the lighter constituents of the refinery C₄ cut which include the iso- and normal butanes and the major portion of the original normal butylene content of the refinery C₄ cut. The lighter portions of the hydrocarbon mixture entering the fractionating column 9 are withdrawn by means of pipe 2a and introduced into the second extractor 3a provided with the usual temperature control jacket and agitation means. The recycle acid from the alkylation unit is introduced into the second extractor by means of pipe 27 or it may be previously admixed with olefin extract from line 13 before introduction into extractor 3a. In this extractor the normal butylenes are extracted by the recycle alkylation acid but the capacity of the extractor 3a is conserved because of the fact that the polymer formed in extractor 3 has been removed by employing fractionating tower 9. The effluent from extractor 3a is introduced into separator 7a by means of pipe 6a. The hydrocarbon layer is withdrawn from separator 7a by means of pipe 8a and discharged into fractionating column 9a equipped with a heating means 10a. Any heavy polymer products which may have been formed in absorber 3a are then removed by means of pipe 11a and combined with the major portion of the polymer products formed during the extraction reactions and which were separated from the other hydrocarbons by means of fractionating column 9. Pipe 11 is therefore connected with pipe 11a. The acid extract leaving separator 7a by means of pipe 13b may be wholly or only partially introduced into extractor 3 as described with reference to Fig. 2. Likewise, the extracts flowing thru lines 13a and 13b may be combined by means of pipe 13c or they may be separately subjected to alkylation reaction conditions as above described with reference to Fig. 2. If the extracts are combined, the combined olefin-sulfuric acid absorption extracts are conducted by means of pipe 13 to the alkylation reactor 16 shown in Fig. 1. The normal and isobutanes withdrawn from fractionating column 9a are introduced into fractionating column 37 of Fig. 1 by means of pipe 36.

In order to more fully understand the exact nature of the present invention, the following examples are given:

Example 1

96% sulfuric acid and a refinery C4 cut containing 11.8% isobutylene, 16.5% normal butylenes, the remainder being a mixture of iso- and normal butane in a 1:3 molar ratio were fed to an extraction reactor continuously, said reactor being equipped with an efficient stirring device. The feed rates were so adjusted that about 0.53 mol of sulfuric acid were fed to the reactor per mol of olefins. After continuing this procedure for some time, the sulfuric acid extract withdrawn from the reactor was found to have a constant composition. This extract phase contained about 0.85 mol of dissolved olefin per mol of sulfuric acid. The contents of the extraction reactor were found to be composed of an emulsion of said extract phase and a hydrocarbon phase in about 1.1:1 weight ratio. The temperature of the extraction reactor was maintained at about 29° F. The effluent hydrocarbon phase from the extraction reactor consisted of about 20.4% by weight of higher boiling hydrocarbons, chiefly olefinic polymers, and about 1.4% by weight of butylene sulfate esters, the remainder of the effluent in the hydrocarbon phase being isobutane and normal butane together with about 2.2 mol per cent of butylenes. Under these conditions, the time of residence in the extraction reactor was about 18 minutes for the extract phase and about 8 minutes for the hydrocarbon phase. The emulsion from the extraction reactor was continuously passed to a settler where the two phases readily separated. The hydrocarbon phase was sent to a column where the C4 hydrocarbons were distilled from the higher boiling liquid hydrocarbons and the butylenes sulfate esters. The latter two components, together with the extract phase from the settler, were fed continuously or intermittently to an alkylation reactor.

This extract phase and higher boiling hydrocarbons (polymers), together with the butylene sulfate esters, were added to an alkylation reactor containing isobutane and sulfuric acid of about 96% concentration. The amount of 96% sulfuric acid present was such as to maintain in the alkylation reactor, upon the addition of the extract phase, together with the higher boiling liquid hydrocarbons and sulfate esters, an acid: hydrocarbon ratio of at least 1:1 by volume. The temperature of the alkylation reactor was maintained at about 60° F. The isobutane was added in sufficient quantity to maintain an isobutane to olefin molar ratio of about 4.9:1. The time of addition of the olefinic materials to the alkylation reactor was over a period of about 40 minutes with an additional 60 minutes time of contact allowed for completion of the reaction. During the time of the olefin addition and the additional time allowed for completion of the reaction, the reaction mixture was vigorously agitated. The total amount of hydrocarbon boiling above C4 and which was substantially completely saturated in character amounted to about 170% by weight based on the olefin converted in the extraction stage. About 81% by volume of this material boiled between about 56 and about 260° F. and had an octane number of about 94 measured by the A. S. T. M. method. The addition of higher boiling liquid hydrocarbons, chiefly composed of olefinic polymers, and the addition of the olefin extract to the alkylation reactor was in amounts of about equal volumes.

Example 2

96% sulfuric acid and a refinery C4 cut containing about 2.9% isobutylene, about 24.3% normal butylenes, the remainder being a mixture of iso- and normal butanes in about a 1:3 volume ratio were fed continuously to an extraction reactor equipped with an efficient stirring mechanism. The feed rates were so adjusted that about 0.68 mol of sulfuric acid were fed per mol of olefin. After the emulsion and resultant extract had attained approximately a constant composition, it was found that the contents of the extraction reactor consisted of an emulsion composed of an extract phase and a hydrocarbon phase in about 1.12 weight ratio of extract phase to hydrocarbon phase. The extract phase contained about 1.15 mols of dissolved olefin per mol of sulfuric acid, the unconverted olefin content of the exit hydrocarbon phase being about 5.7% under the conditions of operation. The time of residence of the extract phase in the extraction reactor was about 14 minutes and of the hydrocarbon phase about 8 minutes. The hydrocarbon phase contained about 12% by weight of higher boiling liquid hydrocarbons, chiefly olefinic in character, about 5.2% of butylenes sulfate esters and a residue of about 5.7% of butylene, the remainder of the hydrocarbon phase being the isobutane and normal butane contained in the original feed. The emulsion from the extraction reactor was passed to a settling chamber where the olefin extract was withdrawn and passed into an alkylation reactor. The liquid hydrocarbon phase was passed into a debutanizer tower where the C4 hydrocarbons were separated from the polymer which was then passed to the alkylation reactor.

The alkylation was conducted substantially as described in Example 1. A product composed of C5 and heavier saturated hydrocarbons was obtained in a yield of about 213% by weight based on the olefins fed to the absorber. About 91.5% of the product boiled in the range 56–260° F. and had an octane number of about 95.2 measured by the A. S. T. M. method.

Example 3

96% sulfuric acid and a C4 fraction containing about 0.3 mol per cent of isobutylene, about 15 mol per cent of normal butylenes, the remainder being a mixture of iso- and normal butanes in about a 1:3 volume ratio, were fed continuously to an extraction reactor equipped with an efficient stirring mechanism. The feed rates were so adjusted that about 1.1 mols of sulfuric acid were fed to the extraction reactor per mol of olefin. An emulsion was withdrawn continuously from the extraction reactor and after the composition of the emulsion had become constant, the emulsion was introduced into a settler where a hydrocarbon phase as an upper layer was separated from an olefin acid extract as a lower layer. The olefin extract in the extractor was in about a 3.3:1 weight ratio of the hydrocarbon phase. The temperature of the extraction reactor was maintained at about 29° F. The extract phase contained about 1.02 mols of dissolved olefin per mol of sulfuric acid. The hydrocarbon phase contained about 2.3% by weight of higher boiling liquid hydrocarbons, chiefly polymers and copolymers of the olefins, about 1.6% by weight of dialkyl esters and about 1.6% of C4 olefins. The remainder of the hydrocarbon phase consisted of isobutane and normal butane. The time of residence of the extract phase in the extraction reactor was about 32 minutes and of the hydrocarbon phase about 5 minutes. The composition of the exit emulsion from the extraction reactant was about one-half weight ratio of extract phase to hydrocarbon phase.

The alkylation was carried out in substantially the same manner as described in Example 1. A substantially completely saturated product composed of C₅ and heavier hydrocarbons was obtained in a yield of about 223% by weight based on the olefins fed to the extraction reactor. Of this product about 93.2% boiled in the range from 56 to 260° F. This fraction had an octane number of about 96.5 measured by the A. S. T. M. method.

From the results of this experiment it would seem that the use of refinery C₄ cuts substantially devoid of isobutylene content yield larger quantities of alkylate boiling in the motor fuel range usually above 90% of a C₅–C₈ fraction. These fractions also possess higher octane numbers than do the fractions obtained from similar treatment when employing feed stocks containing substantial amounts of isobutylene. The addition of the extract to the alkylation mixture should be made over a considerable period of time since the ultimate yields of alkylation products are materially decreased if the olefin extract is added too rapidly so that the concentration of olefin in the alkylation reactor becomes too high. For the alkylation conditions specified in Example 1, that is, using a 5:1 isoparaffin to olefin mol ratio at about a 1:1 acid to hydrocarbon volume ratio, addition times in excess of 30 minutes appear to make little difference in the ultimate yields of the desired products. However, olefin addition times of less than 30 minutes materially affected the ultimate products in quality and in quantity produced. The olefin-acid extract is preferably employed when freshly prepared according to the extraction methods heretofore outlined. Provided the extract is maintained at a temperature of about 0° C. or lower, the alkylating properties of the extracts are not greatly affected by standing prior to their introduction into the alkylation reactor. Prolonged settling periods in the separator connected with the extraction reactor are not harmful provided the temperatures are maintained as above indicated. However, should the temperature rise above 0° C., it becomes increasingly important to insure the immediate consumption of the olefin extract in the alkylation reactor to insure efficient yields of alkylate. The yield of ultimately desired alkylation products is greatly enhanced by employing isobutylene-free feed stocks for the extraction stage. This is especially true in the case of isobutane alkylation and to a less extent in the case of isopentane alkylation.

The above examples disclose the use of about equal volumes of extract and higher boiling liquid products from the hydrocarbon phase being fed to the alkylation reactor. However, it is distinctly understood that the quantities of olefin extract and hydrocarbon layer fed to the alkylation reactor may be varied over wide ranges. In general, motor fuel products of higher octane numbers are obtained when using larger quantities of olefin extract than of hydrocarbon layer containing polymers and copolymers.

It is possible to alter the process of the present invention to the extent that the hydrocarbon layer is not fed to the alkylation zone to which the olefin extract is fed. Olefin polymers produced by either the hot or cold acid processes may be substituted for the liquid hydrocarbon layer produced according to the present process. In the case of such a substitution, a combination of alkylation of such polymers with two-stage alkylation of the residual normal butylenes in the form of the olefin extract produces motor fuel fractions substantially completely saturated in character of higher octane number than would be produced when employing ordinary refinery C₄ cuts containing substantial amounts of isobutylene when processed according to the process of the present invention and wherein the hydrocarbon layer formed is fed to the alkylation reactor, being fed with the olefin extract from the same extraction step.

When used in the description and appended claims, "polymer" is intended to mean condensation products having boiling points higher than any constituents in the feed to the extraction stage. These "polymers" are normally liquids containing both saturated and unsaturated hydrocarbon components.

The nature and objects of the invention having been thus fully described and illustrated, what is claimed as new and useful and desired to be secured by Letters Patent is:

1. In a two-stage alkylation process involving the extraction of olefins with concentrated sulfuric acid followed by contacting the resulting olefin extract with at least one isoparaffin containing at least one tertiary carbon atom per molecular under alkylating conditions, the improvement which comprises extracting the olefins with a concentrated sulfuric acid-olefin extract for a length of time only sufficient to produce an olefin extract containing between about 0.4 and about 1.3 mols of olefin per mol of acid.

2. In a two-stage alkylation process involving the extraction of olefins with sulfuric acid of from 90 to 100% concentration followed by contacting the resulting olefin extract with at least one isoparaffin containing at least one tertiary carbon atom per molecule under alkylating conditions, the improvement which comprises contacting an olefin feed substantially devoid of mono-olefins the molecules of which contain tertiary carbon atoms with a 90 to 100% sulfuric acid-olefin extract until the extract contains between about 0.4 and about 1.3 mols of olefin per mol of sulfuric acid.

3. In a two-stage alkylation process involving the extraction of olefins with sulfuric acid of from 90 to 100% concentration followed by contacting the resulting olefin extract with at least one isoparaffin containing at least one tertiary carbon atom per molecule under alkylating conditions, the improvement which comprises contacting a refinery C₄ cut containing between about 0.2 and about 12.0% of isobutylene and between about 10 and about 30% of normal butylenes with a 90–100% sulfuric acid-n-butylenes extract to obtain finally an olefin extract containing between about 0.4 and about 1.3 mols of dissolved olefin per mol of sulfuric acid.

4. A process which comprises introducing a hydrocarbon mixture containing substantial amounts of normal mono-olefins and relatively small amounts of iso-mono-olefins into an extractor containing partially spent concentrated sulfuric acid of alkylating strength, the rate of addition of acid to addition of total olefin fed to the extractor being between about 0.4 and about 1.25 mols of acid per mol of olefins under such conditions of extraction as to form an olefin-acid extract containing between about 0.4 and about 1.3 mols of olefins per mol of acid, and subsequently alkylating the resultant extract admixed with at least one paraffin containing at least one tertiary carbon atom per molecule under alkylation reaction conditions.

5. A process as in claim 4 wherein the alkylation acid from the alkylation step is returned to the extraction step for further use and wherein the recycled alkylation acid is added to olefin extract to dilute same and using the diluted olefin extract as the extraction medium.

6. A process which comprises contacting a concentrated sulfuric acid solution with mono-olefins in the molar ratio of between about 0.4 and about 1.25 mols of acid per mol olefins fed, separating the extract phase from the hydrocarbon phase, freeing the polymer formed of normally gaseous constituents, combining the extract and polymer, adding an isoparaffin containing at least four carbon atoms per molecule and alkylating said resultant mixture under alkylation reaction conditions.

7. A process which comprises continuously and intimately contacting sulfuric acid of about 96% concentration at a temperature of about 29° F. with a refinery C4 cut containing iso- and normal butylenes, iso- and normal butanes, isobutylene being present in about 11.8% at the molar ratio of about 0.53 mols of acid per mol of butylenes, withdrawing from the extractor butylene-acid extract containing about 0.85 mols of butylenes per mol of acid, separating the extract from polymer, fractionating the C4 paraffins from the polymer, continuously feeding extract and debutanized polymer together with isobutane to an alkylation reactor maintained at about 60° F., the isobutane being present in about 4.9:1 molar ratio with respect to the olefin equivalent fed as extract, vigorous agitating the alkylation reaction mixture, removing the reacted mixture to an acid settler, withdrawing the hydrocarbon phase, neutralizing and recovering the saturated normally liquid branched chain hydrocarbons containing at least five carbon atoms per molecule.

8. A process as in claim 7 wherein at least a portion of the partially spent alkylation acid is employed in the extracting stage for the butylene extraction and wherein the entire unit is operated under sufficient superatmospheric pressure to maintain the reactants and hydrocarbon constituents present in the system in the liquid phase under the conditions obtaining.

9. A process which comprises continuously and intimately contacting a refinery C4 cut containing normal butylenes, iso- and normal butanes and being substantially free of isobutylene at a temperature of about 29° F. with about 96% sulfuric acid, the molar ratio of feed being about 1.1 mols of acid per mol of normal butylenes, withdrawing from the extractor normal butylene-acid extract containing about 1.02 mols of normal butylenes per mol of acid, separating the extract from hydrocarbon polymer, fractionating the C4 paraffins from the polymer, continuously feeding extract and debutanized polymer together with isobutane to an alkylation reactor maintained at about 60° F., the isobutane being present in about a 5:1 molar ratio with respect to the olefin equivalent fed as extract, vigorously agitating the alkylation reaction mixture, removing the reacted mixture to an acid settler, withdrawing the hydrocarbon phase, neutralizing and recovering the saturated normally liquid branched chain hydrocarbons containing at least five carbon atoms per molecule.

10. A process which comprises forming an extract of normal monoolefin in 90–100% sulfuric acid, containing a mixture containing substantial amounts of the corresponding iso-monoolefin with said extract to absorb the iso-monoolefin therein, and alkylating isoparaffin with said resulting extract under alkylation reaction conditions.

11. A process which comprises forming an absorption product of at least one normal butylene in 90–100% sulfuric acid, contacting a mixture containing substantial amounts of iso and normal butylenes with said extract to absorb substantially only the isobutylene content thereof, and reacting isoparaffin with said resulting extract under alkylation reaction conditions.

12. A process which comprises forming an absorption product of at least one normal butylene in 90–100% sulfuric acid, contacting a mixture containing substantial amounts of iso and normal butylenes with said extract to absorb substantially only the isobutylene content thereof, the normal butylene from the isobutylene absorption step being contacted with withdrawn alkylation acid to form extract employed in the isobutylene absorption step, and reacting isoparaffin with said resulting iso-normal-butylenes acid extract under alkylation reaction conditions.

13. In a two-stage alkylation process involving the extraction of monoolefins with concentrated sulfuric acid of alkylating strength followed by contacting the resultant olefin extract with isoparaffin and concentrated sulfuric acid of alkylating strength under alkylation reaction conditions, the improvements comprising extracting the said olefins with the said acid while maintaining a molar ratio of acid to olefin during the absorption of between about 0.4:1 and about 1.25:1 until the extract formed contains between about 0.4 and about 1.3 mols of olefin per mol of acid.

14. A process which comprises contacting monoolefin with sulfuric acid of alkylating strength under absorption conditions to form an olefin-sulfuric-acid extract containing between about 0.4 and about 1.3 mols of olefin per mol of acid while maintaining in the absorption zone between about 0.4 and about 1.25 mols of acid per mol of olefin, separately contacting a mixture of the resultant extract and isoparaffin with concentrated sulfuric acid of alkylating strength under alkylation reaction conditions, and recovering the normally liquid alkylate from the reacted mixture.

15. A process as in claim 14 wherein the olefin is a normal monoolefin.

16. A process as in claim 14 wherein the olefin is a normal C4 monoolefin and the isoparaffin is isobutane.

17. A process as in claim 14 wherein the olefin is a normal monoolefin, the sulfuric acid has a concentration between about 90% and about 100%, and the isoparaffin is isobutane.

18. A process which comprises contacting a refinery C4 cut containing substantial amounts of iso and normal butenes, iso and normal butanes, with concentrated sulfuric acid of alkylating strength under absorption conditions while maintaining in the absorption zone between about 0.4 and about 1.25 mols of acid per mol of butenes present, until the extract formed contains between about 0.4 and about 1.3 mols of olefin per mol of acid, withdrawing the said extract and separately alkylating the same with isobutane in the presence of concentrated sulfuric acid of alkylating strength under alkylation reaction conditions.

19. A process as in claim 18 wherein polymer is formed in the absorption zone and is recovered and admixed with the extract prior to the alkylation of the said extract with isobutane.

20. A process which comprises introducing a hydrocarbon mixture containing substantial amount of both normal and iso monoolefins into contact with a concentrated sulfuric acid-normal olefin extract under conditions suitable for the substantial selective absorption of only the isoolefin in the said extract, the concentrated sulfuric acid being of alkylating strength, separating the unabsorbed constituents of the said hydrocarbon mixture from the resultant combined extract, absorbing the normal olefinic constituents of the said hydrocarbon mixture in concentrated sulfuric acid of alkylating strength, utilizing the normal olefin acid extract as the absorption medium for the selective absorption of the isoolefin in the first extraction stage and alkylating the combined extract admixed with at least one paraffin containing at least one tertiary carbon atom per molecule under alkylation reaction conditions.

21. A process which comprises introducing a hydrocarbon mixture containing substantial amounts of both iso and normal monoolefins into contact with a concentrated sulfuric acid-normal olefin extract under conditions suitable for the substantial selective absorption of only the isoolefin in the said extract, the concentrated sulfuric acid being of alkylating strength, separating the unabsorbed constituents of the said hydrocarbon mixture from the resultant combined extract, absorbing the normal olefinic constituents of the said hydrocarbon mixture in concentrated sulfuric acid of alkylating strength, utilizing at least a portion of the normal olefin-acid extract as the absorption medium for the selective absorption of the isoolefin in the first extraction stage and alkylating at least a portion of both extracts admixed with at least one paraffin containing at least one tertiary carbon atom per molecule under alkylation reaction conditions.

CHARLES E. MORRELL.